United States Patent [19]

Watanabe et al.

[11] Patent Number: 4,881,152
[45] Date of Patent: Nov. 14, 1989

[54] HEADLIGHT FOR AUTOMOBILE

[75] Inventors: Shinji Watanabe; Akira Saijo, both of Shizuoka, Japan

[73] Assignee: Koito Seisakusho Co., Ltd., Tokyo, Japan

[21] Appl. No.: 245,989

[22] Filed: Sep. 14, 1988

[30] Foreign Application Priority Data

Sep. 22, 1987 [JP] Japan .................... 62-145531[U]
Jun. 21, 1988 [JP] Japan .................... 63-152973

[51] Int. Cl.⁴ .................... B06Q 1/06; F21V 3/18
[52] U.S. Cl. .................... 362/61; 362/66; 362/289; 362/428
[58] Field of Search .................... 362/61, 66, 64, 70, 362/80, 269, 273, 285, 289, 427, 428

[56] References Cited

U.S. PATENT DOCUMENTS

| | | | |
|---|---|---|---|
| 4,318,162 | 3/1982 | Sip | 362/226 |
| 4,471,413 | 9/1984 | Dick | 362/428 |
| 4,491,901 | 1/1985 | Sigety, Jr. | 362/275 |
| 4,503,486 | 3/1985 | Makita | 362/61 |
| 4,569,007 | 2/1986 | Dick | 362/294 |
| 4,574,334 | 3/1986 | Igura | 362/66 |
| 4,621,307 | 11/1986 | Weber | 362/66 |
| 4,680,679 | 7/1987 | DiLouya | 362/61 |
| 4,689,725 | 8/1987 | Saijo et al. | 362/66 |
| 4,712,164 | 12/1987 | McMahan et al. | 362/66 |
| 4,722,033 | 1/1988 | VanDuyn et al. | 362/80 |
| 4,742,435 | 5/1988 | VanDuyn et al. | 362/66 |
| 4,761,717 | 8/1988 | McMahon et al. | 362/66 |

FOREIGN PATENT DOCUMENTS 3525041 1/1987 Fed. Rep. of Germany .
2029954 3/1980 United Kingdom .
2109082 5/1983 United Kingdom .

Primary Examiner—Ira S. Lazarus
Assistant Examiner—Peggy Neils
Attorney, Agent, or Firm—Browdy and Neimark

[57] ABSTRACT

A headlight device for use in an automobile and of the type including a lamp body having a recess which opens forward, a lens covering the forward opening of the lamp body and a reflective mirror tiltably supported in the lamp body through one rotatable support portion and two space adjusting portions. Each space adjusting portion consists of a nut member supported on the reflective mirror, an adjusting rod rotatably supported on the lamp body and having a screw-thread portion for screw-threadingly engaging with the nut member, a gear unit consisting of two intermeshing bevel gears with one of which being connected to the rear end of the adjusting rod, and an actuating rod with the front end of which being located near to the front end of a side surface of the lamp body and the rear end of which being connected to the other bevel gear of the gear unit.

6 Claims, 10 Drawing Sheets

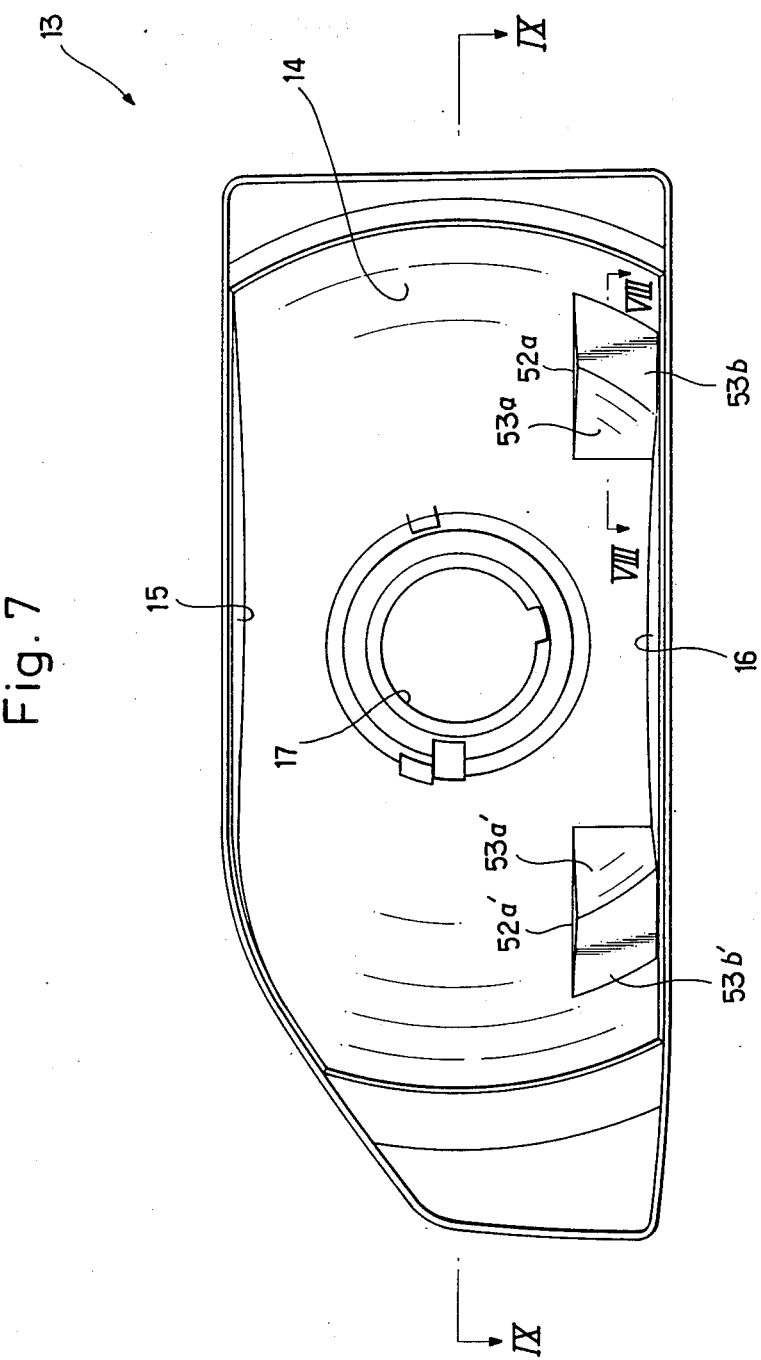

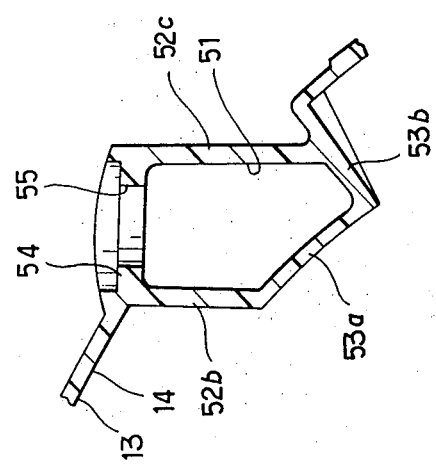
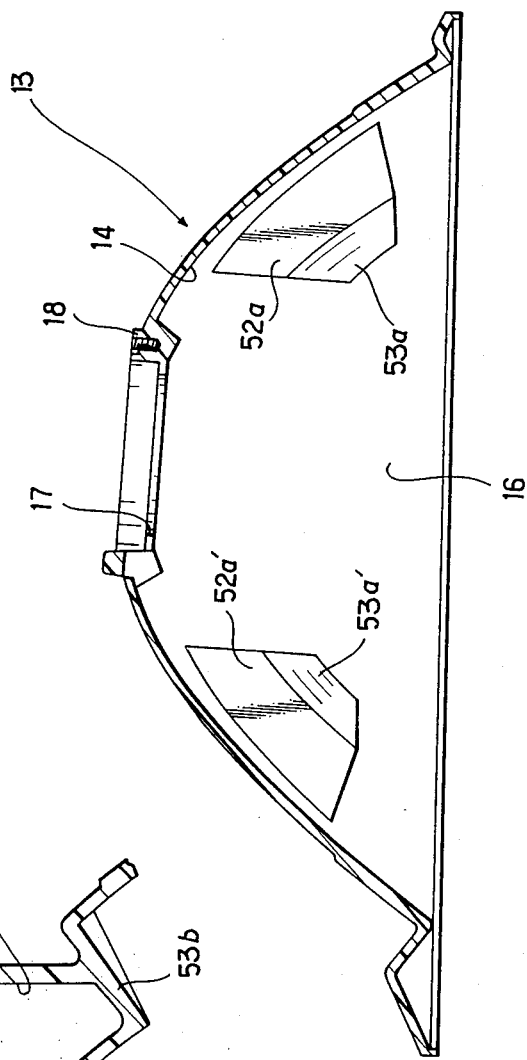

HEADLIGHT FOR AUTOMOBILE

FIELD OF THE INVENTION

The present invention relates to a headlight for use in an automobile and, particularly to a headlight having therein a tiltable reflective mirror.

DESCRIPTION OF PRIOR ART

There has been various proposals relative to a tiltable reflective mirrors mounted in a space defined by a lens and a lamp body of a headlight and, typically, as shown in FIG. 10, the reflective mirror is supported on the lamp body through one rotatable support portion and two space adjusting portions.

In FIG. 10, a lamp body b formed of a synthetic resin material has a recess c opening in the forward direction and, a lens d is mounted on the lamp body b to cover the front opening of the recess c. A reflective mirror e is tiltably mounted on the lamp body b through a rotatable support portion f and two space adjusting portions (only one space adjusting portion m is shown in the drawing).

The rotatable support portion f comprises a supporting shaft g supported on the lamp body b and a receptacle h supported on the reflective mirror e. A screw-thread portion i is formed on the supporting shaft g and engages screw-threadingly with the rear portion of the lamp body b. A spherical portion j is integrally formed on the front end of the shaft g and engages with the receptacle h which is formed of a synthetic resin material and has a rear facing recess k of corresponding configuration. The receptacle h is mounted on the rear end of a bracket 1 projecting on the rear surface of the reflecting mirror e. The spherical portion j is received in the recess k, thereby constituting the rotatable support portion f of a ball joint like construction.

The space adjusting portion m comprises an adjusting rod n rotatably supported on the lamp body b and a nut member o supported on the reflective mirror e. The adjusting rod n consists of a screw-thread portion p and a head portion q. The head portion q projects on the rear surface of the lamp body b and the screw-thread portion p engages with the nut member o which, in turn, is supported on the rear end of a bracket r projecting on the rear surface of the reflective mirror e. When the rod n is rotated the space between the lamp body b and the reflective mirror is is adjusted.

Another space adjusting portion is spaced from the space adjusting portion m in the transverse direction or the direction vertical to the paper of the drawing and has the construction similar thereto.

In the prior art device shown in FIG. 10, the space adjusting portion m projects by a large amount in the rear direction, thus, there is a problem that the size of the headlight device in the front and rear direction increases. Namely, in the space adjusting portion m, the nut member o is required to have a sufficient space from the rear surface of the reflective mirror e so as to permit the adjusting movement of the adjusting rod n in the direction threading into the nut member o, and the head portion q of the adjusting rod n is required to have a sufficient space from the nut member o so as to permit the movement of the adjusting rod n in the direction threading out of the nut member o. Thus, the space for mounting the headlight device increases and, accordingly, the space of an engine compartment of the automobile decreases.

FIG. 11 shows a modified form of the prior art device of FIG. 10, wherein the operation of the space adjusting portion can be performed from the front side of the headlight device. A spur gear t is secured to the rear end of the adjusting rod n projecting from the rear surface of the lamp body b and meshingly engages with a spur gear v. The spur gear v is secured to the rear end of an actuating rod u which extends in the front and rear direction at the lower side of the lamp body b and is supported rotatably on the lamp body b or on a body of the vehicle (not shown in the drawing). When the actuating rod u is rotated, the engagement between spur gears t and v rotates the adjusting rod n.

However, the arrangement shown in FIG. 11 increases the size of the headlight device since the spur gear v and the actuating rod u project largely out of the outer edge of the headlight device a, thereby increasing the overall size of the headlight device.

SUMMARY OF THE INVENTION

The present invention has been made in view of the circumstances aforementioned, and aims to provide a headlight device for use in an automobile and of the type including a lamp body having a recess which opens forward, a lens covering the forward opening of the lamp body, and a reflective mirror tiltably supported in the lamp body. Wherein the reflective mirror is supported on the lamp body through one rotatable support portion and two space adjusting portions; each space adjusting portion consists of a nut member supported on the reflective mirror, an adjusting rod rotatably supported on the lamp body and having a screw-thread portion for screw-threadingly engaging with the nut member, a gear unit consisting of two intermeshing bevel gears with one of which being connected to the rear end of the adjusting rod, and an actuating rod with the front end of which being located near to the front end of a side surface of the lamp body and the rear end of which being connected to the other bevel gear of the gear unit; and a recessed portion is formed in the reflective mirror and in front of each of the nut member.

Thus, according to the invention, the front end of the adjusting rod is received in the recessed portion formed in the rear surface of the reflective mirror so that the adjusting rod is prevented from projecting backward, and it is possible to reduce the depth or the longitudinal size of the headlight device substantially. Further, the mechanism for rotating the adjusting rod from the front side of the device is constituted by two bevel gears with one of which being connected to the rear end of the adjusting rod and the other of which being connected to the rear end of the actuating rod, thus, it is possible to arrange the adjusting rod and the actuating rod can be arranged such that the front ends are spaced and the rear ends are located contiguously, whereby the actuating rod does not project a large amount from the side surface of the lamp body.

BRIEF DESCRIPTION OF THE DRAWINGS

Further objects and effects of the invention will become apparent from the following detailed description in conjunction with the attached drawings, in which:

FIG. 7 is a front view of a reflective mirror of the headlight device of FIG. 1;

FIG. 8 is an enlarged cross-sectional view taken along line VIII—VIII in FIG. 7;

FIG. 9 is a cross-sectional view taken along line IX—IX in FIG. 7;

DETAILED DESCRIPTION OF PREFERRED EMBODIMENTS

Figure 1:
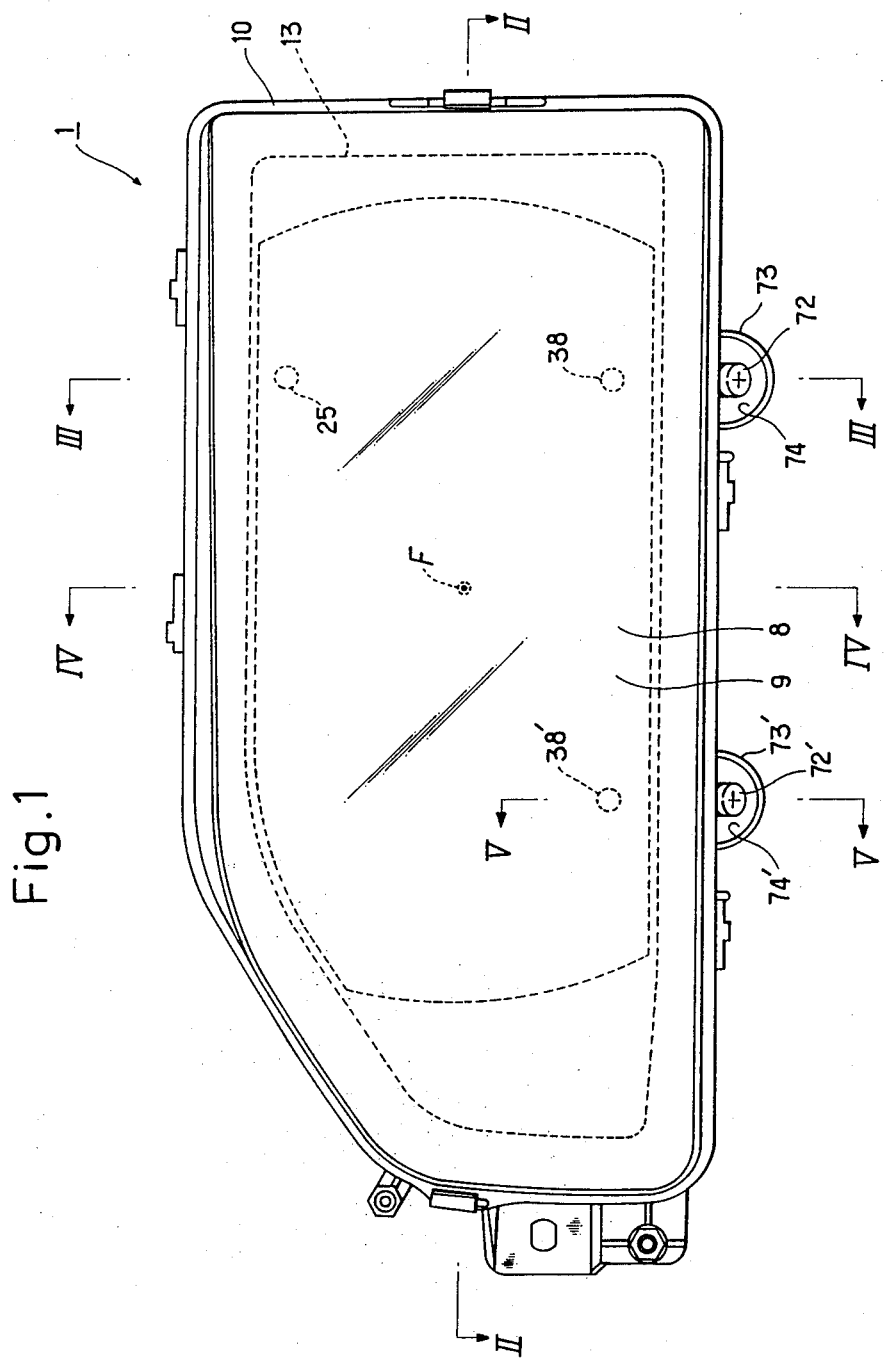
FIG. 1 is a front view of one example of a headlight device according to the present invention.
Figure 2:
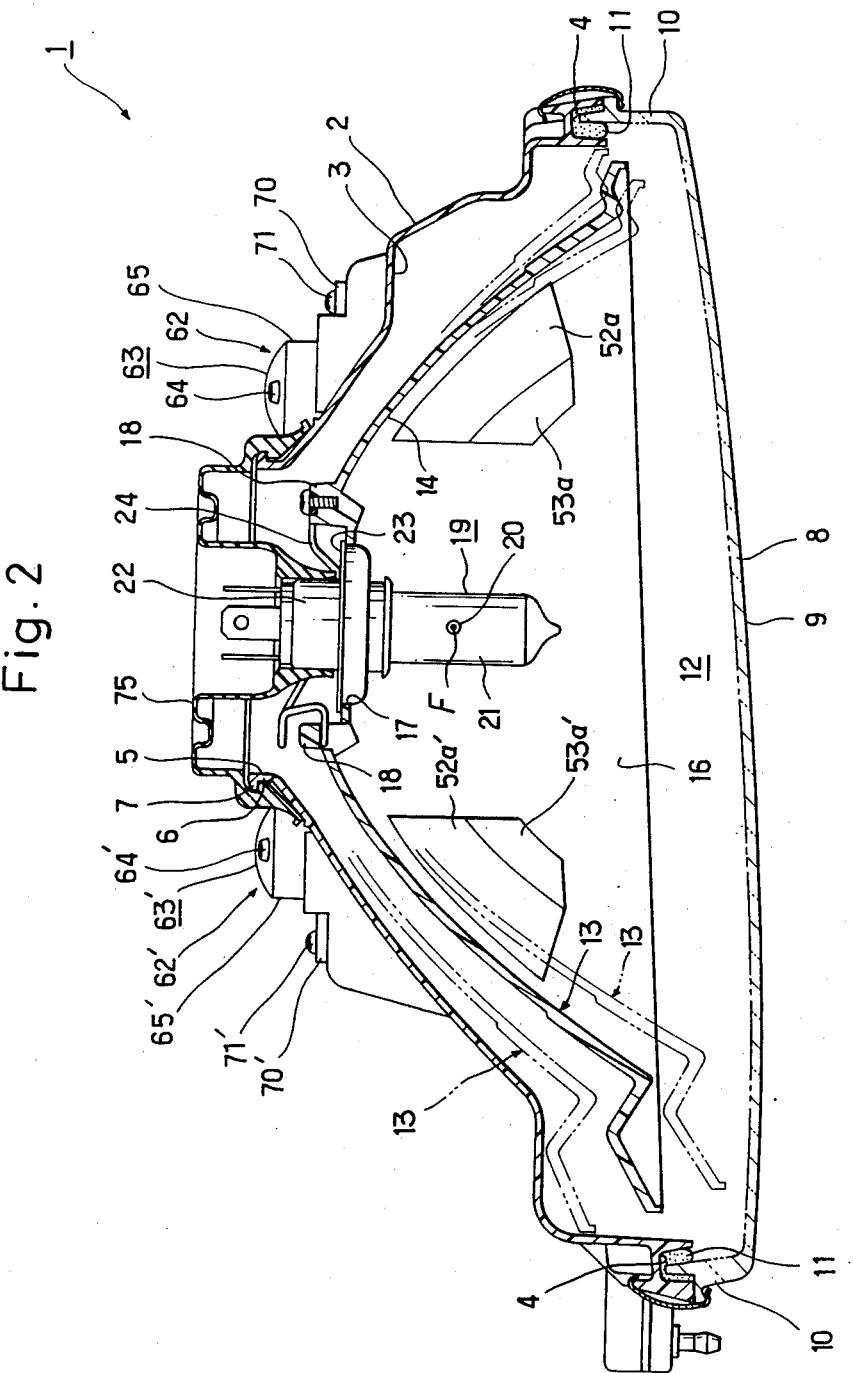
FIG. 2 is a section view taken along line II—II in FIG. 1.
Figure 3:
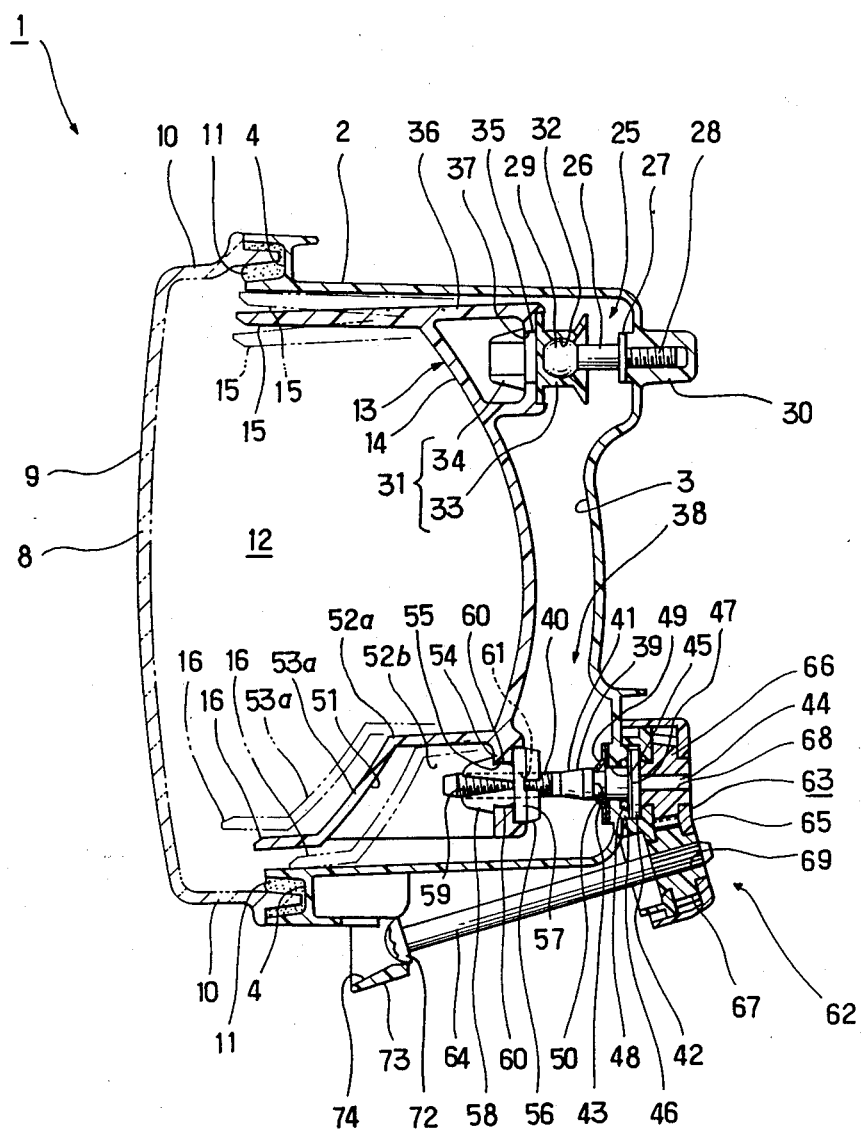
FIG. 3 is a section view taken along line III—III in FIG. 1.
Figure 4:
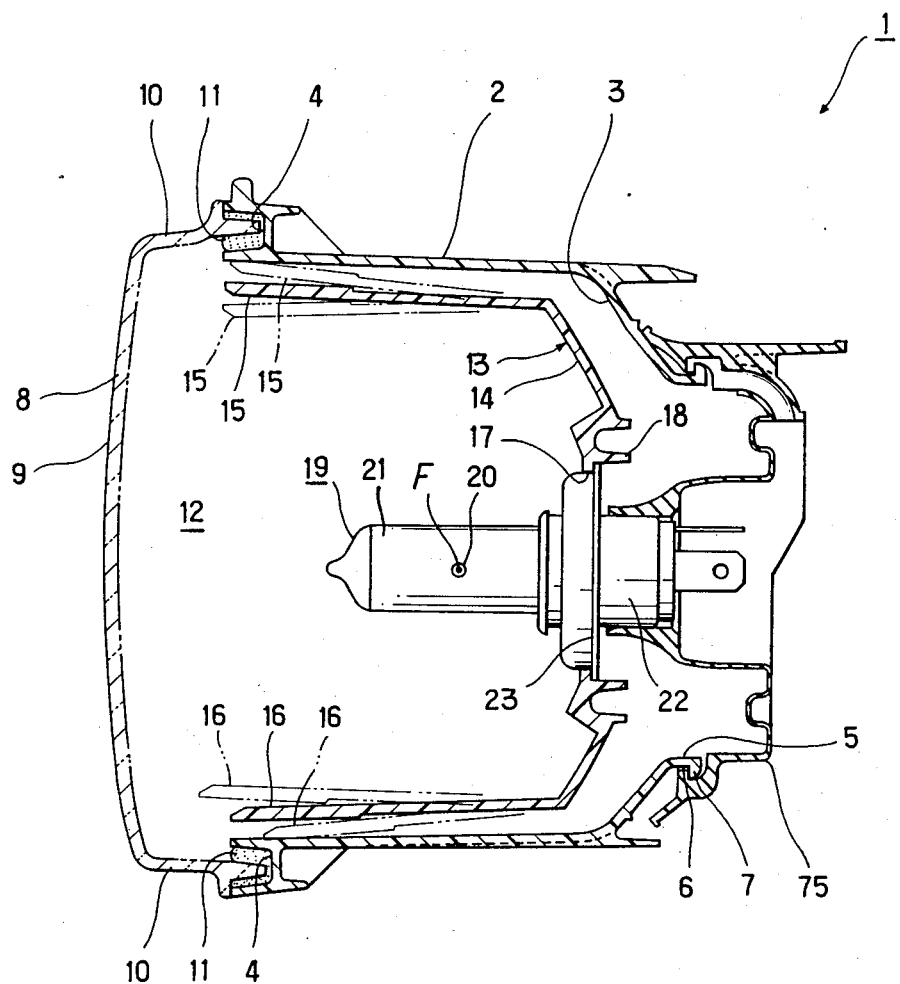
FIG. 4 is a section view taken along line IV—IV in FIG. 1.

FIG. 1 through FIG. 9 show one example of a headlight device according to the invention, which comprises a lamp body 2 formed of a synthetic resin material. A recess 3 is formed in the lamp body 2 and has a front opening of a generally rectangular configuration. A mounting groove 4 is formed in the circumferential edge of the front opening as shown in FIGS. 2, 3 and 4, and a circular opening 5 is formed in the central portion of the rear end of the lamp body 2 by a tubular portion 6 of a short length. A circumferentially projecting flange 7 is formed on the rear end of the tubular portion 6.

A lens 8 has a front surface portion 9 of the shape corresponding to the front opening of the lamp body 2, and a circumferential wall portion 10 integrally formed with the front surface portion 9 and extending therefrom backward. The rear end of the circumferential wall portion 10 is fitted in the mounting groove 4 in the lamp body 2 and is secured thereto by bonding agent 11.

A lamp space 12 is defined between the lamp body 2 and the lens 8.

A reflective mirror 13 is tiltably mounted in the lamp space 12 and is formed of a synthetic resin material. The reflective mirror 13 has a parabolic surface portion 14 having a generally rectangular shape as viewed from the front, and generally flat surface portions 15 and 16 integrally formed on the upper and lower ends of the parabolic surface portion 14 respectively. A reflective film is formed on the inner surface of the reflective mirror 13 by such as aluminum vaporization.

A circular bore 17 is formed in generally central part of the parabolic surface portion 14 for mounting an electric bulb 19. An annular ridge 18 is formed adjacent to the rear end of the bore 17.

The electric bulb 19 consists of a glass tube 21 which has therein a filament 20, and a socket 22 attached to the rear end of the glass tube 21 and having a flange 23. The bulb 19 is inserted through the mounting bore 17 from the rear end with the outer peripheral portion of the flange 23 abutting with the rear surface of the edge of the bore 17. A retaining spring 24 is mounted on the annular ridge 18 and resiliently engages with the rear surface of the flange 23. The filament 20 is located adjacent to the focus F of the parabolic surface 14.

The reflective mirror 13 is tiltably mounted on the lamp body 2 through one rotatable support portion and two space adjusting portions.

The rotatable support portion 25 is located in the upper right portion as viewed in front view (FIG. 1).

As shown in FIG. 3, the rotatable support portion 25 comprises a support shaft 26 and a receptacle 31. The shaft 26 has a flange 27 on the intermediate portion, a plug portion 28 on the rear side (right side in FIG. 3) and a ball end 29 on the front end. The plug portion 28 is fitted in a boss portion 30 formed integrally on the lamp body 2. In FIG. 3, the plug portion 28 is secured to the boss portion 30 through screw-threads, but may be secured through any suitable means such as bonding, force fitting and the like.

The receptacle 31 is formed of a synthetic resin material and comprises a main body portion 33 having a recess 32 opening in the rear direction, a mounting portion 34 projecting forward from the main body portion 33 and a circumferential groove 35 formed between the main body portion 33 and the mounting portion 34. The mounting portion 34 is mounted on a bracket 36 which is formed integrally on the rear surface of the reflective mirror 13 is project in the rear direction. The mounting portion 34 of the receptacle 31 is fitted in a mounting hole 37 in the bracket 36 with groove 35 engaging with the peripheral edge of the mounting hole 37. Thus, the receptacle 31 is supported on the reflective mirror 13.

The ball end 29 of the support shaft 26 is rotatably received in the recess 32 of the receptacle 31 to form the rotatable support portion 25 of a generally ball joint like constitution.

The space adjusting portions 38 and 38' are, as viewed in FIG. 1, located respectively at the location aligning vertically with the rotatable support portion 25 and at the location aligning horizontally with the space adjusting portion 38. Since the construction of the adjusting portions 38 and 38' are similar, the description of the adjusting portion 38' is omitted and parts corresponding to the portion 38 are denoted by the same reference numerals with the prime applied thereon.

The space adjusting portion 38 comprises, as shown in FIG. 3, an adjusting rod 39 rotatably mounted on the lamp body 2, a nut member 56 mounted on the reflective mirror 13 and screw-threadingly engaging with the adjusting rod 39 and a mechanism 62 for rotating the adjusting rod 39.

The adjusting rod 39 has a front screw-thread portion 40, an intermediate portion 41 having a flange 42 on the rear end and a retaining groove 43 adjacent to the flange 42, and a rear end portion 44 of a generally rectangular cross-section. A mounting bore 45 is formed in the rear wall of the lamp body 2, and an annular ridge 46 is formed on the rear surface of the lamp body 2 to surround the bore 45.

The adjusting rod 39 is inserted into the bore 45 with a washer 47 interposing between the front surface of the flange 42 and the annular ridge 46, and an O-ring 48 interposing between the front surface of the washer 47 and the rear end of the bore 45 and between the inner circumference of the annular ridge 46 and the outer circumference of the intermediate portion 41.

A retaining washer 49 is resiliently mounted on the inner surface of the lamp body 2 with the peripheral inner edge 50 thereof being fitted in the retaining groove 43 of the rod 39. Thus, the rod 39 is rotatably supported on the rear wall of the lamp body 2 and the axial movement thereof is prevented.

In the rear surface of the reflective mirror 13, a recess 51 of generally longitudinally extending inverted U- shaped configuration is formed. And the recess 51 is defined by three side walls 52a, 52b and 52c and by two front wall portions 53a and 53b, and opens downward. The rear end of the recess 51 is defined by a plate like bracket 54. The bracket 54 is formed integrally with the reflective mirror 13 and a mounting bore 55 is formed in the bracket 54.

The front wall portion 53a located near to the center of the reflective mirror 13 has a parabolic surface on the front side, and the focal distance of the parabolic surface is shorter than that of the parabolic surface portion 14, with the focal point being located on the focal point F of the parabolic surface portion 14. Thus, the front surface of the wall portion 53a acts as a part of effective reflective surface of the headlight.

A nut member 56 is formed of synthetic resin material and consists of a thick main body 57 and mounting legs 58 formed integrally with the main body 57 and extending forward therefrom. The mounting legs 58 consist of two portions 58a and 58a separated by V-shaped grooves 59, and have in the outer circumference retaining grooves 60 and 60 respectively. A screw-thread hole 61 is formed in the nut member 56.

The nut member 56 is mounted in the mounting bore 55 of the bracket 54 of the reflective mirror 13 from the rear side. The mounting legs 58 are inserted through the bore 55, and the retaining grooves 60 engage with the bore 55 to retain the nut member 56 on the bracket 54.

The screw-thread portion 40 of the adjusting rod 39 engage with the nut member 56, and the front end of the screw-thread portion 40 is received in the recess 51. Thus, the space adjusting portion 38 is formed as described heretofore.

When the adjusting rod 39 is rotated, the screw-thread portion 40 is, in response to the rotational direction of the rod 39, threaded into or out of the nut member 56 so that the nut member 56 moves toward (rearward) or remote from (forward) the lamp body 2, since the axial movement of the rod 39 relative to the lamp body 2 is prevented.

When the adjusting rods 39 and 39' of the space adjusting portions 38 and 38' are rotated simultaneously in the same direction, the reflective mirror 13 rotates in the vertical direction. When the adjusting rod 39; of the space adjusting portion 38' is rotated, the mirror 13 rotates in the horizontal direction. And when the adjusting rod 39 of the space adjusting portion 38 is rotated, the reflective mirror 13 rotates diagonally around a line connecting the rotatable support portion 25 and the space adjusting portion 38'.

The space adjusting portions according to the present invention are formed to enable the adjusting operation from the front side of the headlight.

Figure 5:
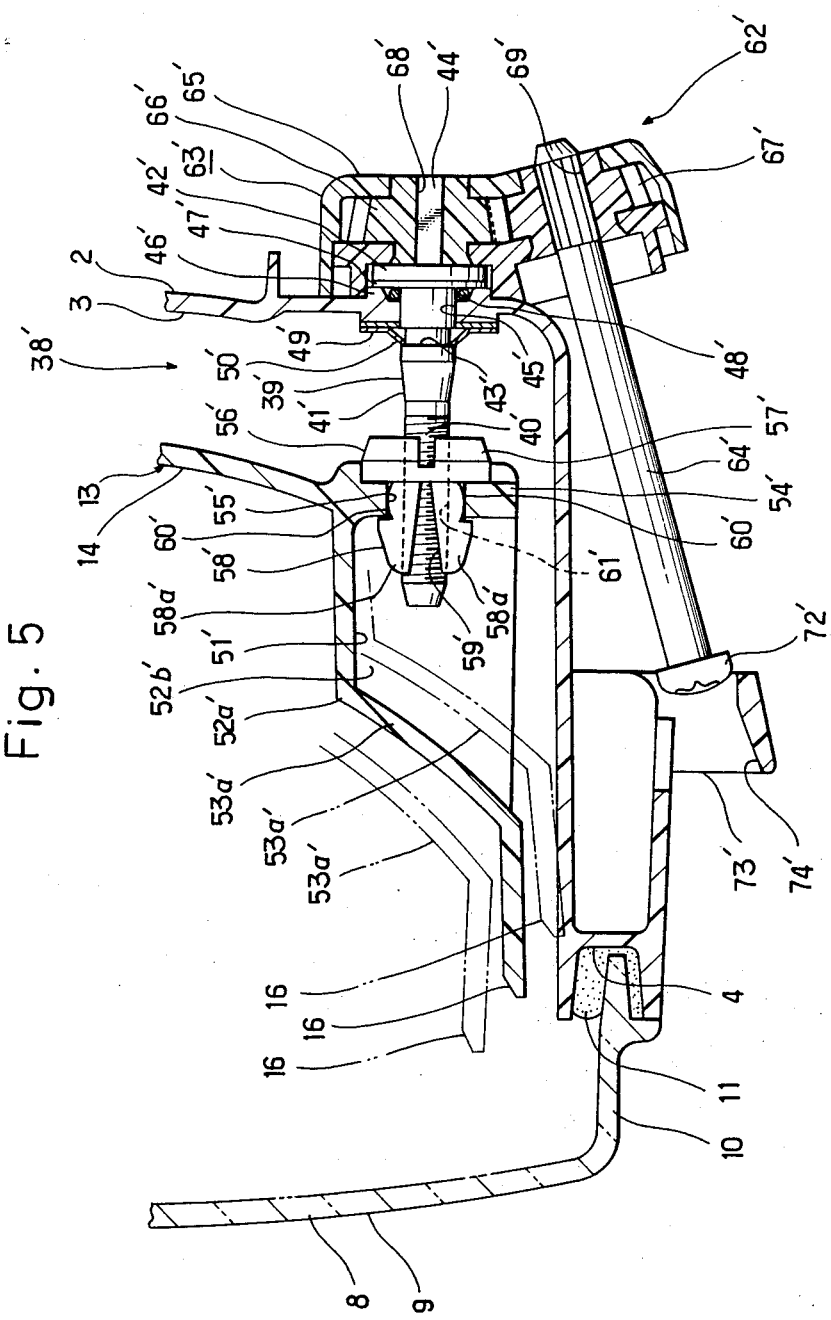
FIG. 5 is a enlarged cross-sectional view taken along line V—V in FIG. 1.
Figure 6:
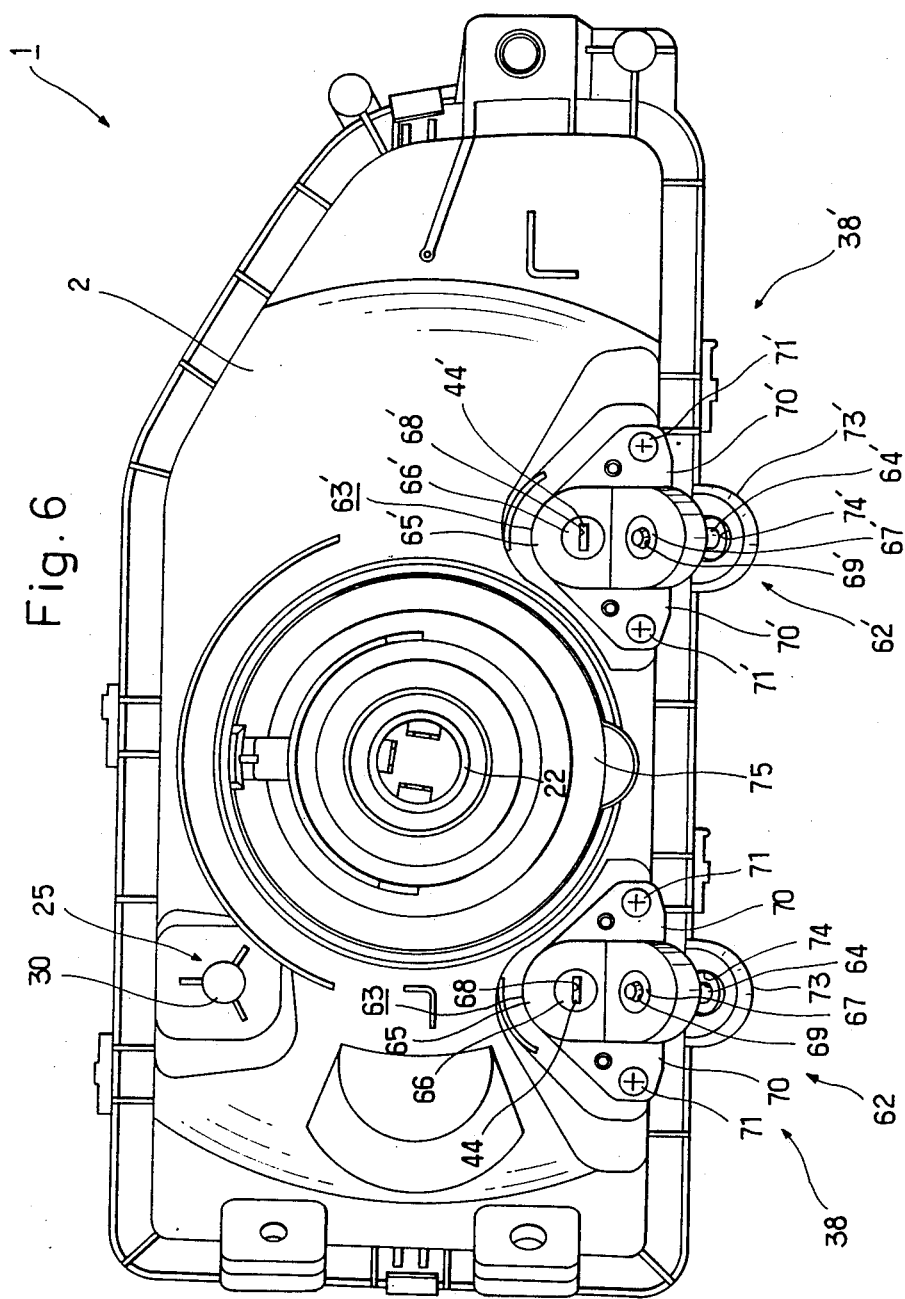
FIG. 6 is a rear view of the headlight device of FIG. 1.
Figure 10:
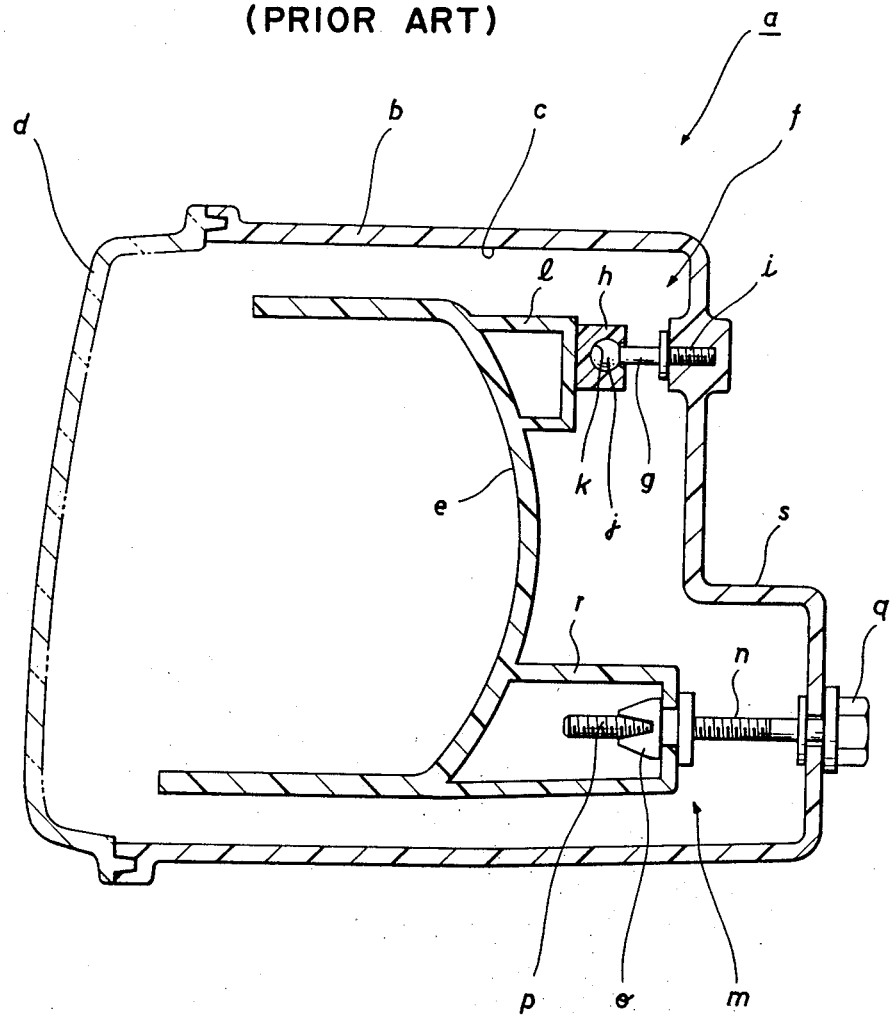
FIG. 10 is a cross-sectional view showing an essential portion of a typical prior art headlight device.
Figure 11:
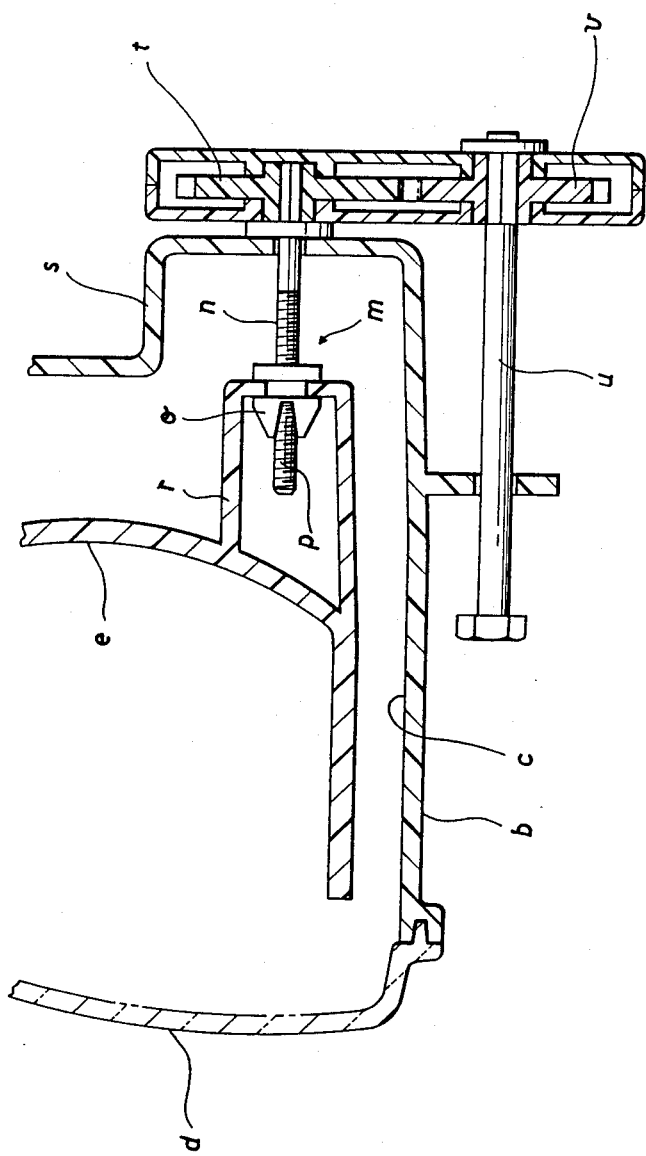
FIG. 11 is a view similar to FIG. 10 but showing a modified form of the prior art device.

Shown at 62 in FIGS. 3, 5 and 6 is a mechanism for operating the space adjusting portion 38. The mechanism consists of a gear unit 63 and an operating rod 64.

The gear unit 63 includes a casing 65 and two bevel gears 66 and 67. The bevel gears 66 and 67 are rotatably supported in the casing 65 and arranged meshingly and generally vertically as shown in FIGS. 3 and 5. The axis of the gear 67 inclines downward and forward. The bevel gear 66, located upwardly of gear 67 has a central rectangular bore 68 for connecting with the connecting portion 44 of the adjusting rod 39. A bore 69 is formed in the bevel gear 67 of the lower side for forcibly receiving the rear end portion of the operating rod 64. The casing 65 has on opposite sides mounting pieces 70 and 70 integrally for mounting the casing 65 on the rear surface of the lamp body 2 through mounting screws 71 and 71.

The operating rod 64 has a head portion 72 having a Phillips head on the front end. On the lower surface of the lamp body 2, a guide piece 73 having a guide bore 74 is provided to guide a Phillips type screwdriver to the head portion 72 of the operating rod 64.

Shown at 75 in FIG. 4 is a rubber cover, with the inner end being fitted on the socket portion 22 of the bulb 19 and the radially outer end thereof being fitted on the tubular portion 6 on the rear end of the lamp body 2 and engaging with the flange 7.

As described heretofore, the headlight device for use in an automobile according to the invention is of the type including a lamp body having a recess opening in the front direction, a lens covering the front opening of the lamp body, a reflective mirror tiltably supported in a lamp space defined by the lamp body and the lens, and a lamp supported on the reflective mirror. The reflective mirror is supported on the lamp body through one rotatable portion and two space adjusting portions; each space adjusting portion consists of a nut member supported on the reflective mirror and an adjusting rod rotatably supported on the lamp body and having a screwthread portion for screw-threadingly engaging with the nut member; a bracket is formed on the reflective mirror integrally for supporting the nut member and has a recess in the front portion thereof; and the front surface of a wall defining the front end of the recess acts as a part of the reflective mirror.

Therefore, the front ends of adjusting rods of space adjusting portions are respectively received in recesses which are formed in front of the brackets of reflective mirror, thus the rear end of the adjusting rods do not project largely from the rear surface of the lamp body, whereby the depth or the longitudinal size of the device can be minimized. Further, the front surface of the wall defining the front end of the recess is constituted of a part of effective reflective surface of the headlight device, thus, it is possible to prevent the decrease in the area of the effective reflective surface.

What is claimed is:

1. A headlight device for use in an automobile, comprising:

a lamp body having a recess which opens forward with respect to a vehicle onto which the headlight device is to be mounted;

a lens covering the recess of the lamp body;

a reflective mirror tiltably supported in the lamp body;

one rotatable support portion and two space adjusting portions for supporting the reflective mirror on the lamp body, each space adjusting portion comprising a nut member supported on the lamp body and having a front and rear end with respect to the vehicle onto which the headlight device is to be mounted and a screw-thread portion for screw-threadingly engaging with the nut member, a gear unit consisting of two intermeshing bevel gears, one of said bevel gears, being connected to the rear end of the adjusting rod, and an actuating rod having a front end located near to a front end of a side surface of the lamp body and a rear end connected to the other bevel gear of the gear unit with respect to the vehicle onto which the headlight device is to be mounted; and a recessed portion formed in the reflective mirror and in front of each of the nut members with respect to the vehicle onto which the headlight device is to be mounted.

2. A headlight device as set forth in claim 1, wherein the lamp body and the reflective mirror are formed of a synthetic resin material.

3. A headlight device as set forth in claim 1, wherein the lamp body has a front opening, with respect to the vehicle onto which the headlight device is to be mounted, of a generally rectangular configuration.

4. A headlight device as set forth in claim 1, wherein a reflective film is formed on the inner surface of the reflective mirror by aluminum vaporization.

5. A headlight device as set forth in claim 1 wherein a front surface of the recessed device with respect to the vehicle onto which the headlight device to be mounted acts as a part of the reflective mirror.

6. A headlight device as a set forth in claim 1, further comprising a mechanism for rotating the adjusting rod extending generally in the front and rear direction with respect to the vehicle on which the headlight device is to be mounted comprising the two bevel gears which are mutually engaging, and wherein the axes of the bevel gears are inclined toward each other such that the axes divergingly separate from each other in the forward direction with respect to the vehicle onto which the headlight device is to be mounted, and wherein said mechanism rotates the adjusting rod from the front side of the headlight device with respect to the vehicle on which the headlight device is to be mounted.

* * * * *

UNITED STATES PATENT AND TRADEMARK OFFICE
CERTIFICATE OF CORRECTION

PATENT NO. : 4,881,152

DATED : November 14, 1989

INVENTOR(S) : WATANABE et al.

It is certified that error appears in the above-identified patent and that said Letters Patent is hereby corrected as shown below:

Column 6, line 54    After "supported", insert -- on the reflective mirror, an adjusting rod rotatably supported --

Signed and Sealed this

Tenth Day of December, 1991

Attest:

HARRY F. MANBECK, JR.

Attesting Officer    Commissioner of Patents and Trademarks